United States Patent [19]
van den Berg

[11] 3,793,967
[45] Feb. 26, 1974

[54] MANURE SPREADER
[75] Inventor: Pieter van den Berg, Wilson, N.C.
[73] Assignee: The Lely Corporation, Wilson, N.C.
[22] Filed: June 28, 1971
[21] Appl. No.: 157,467

[52] U.S. Cl. ................................................. 111/7
[51] Int. Cl. ............................................. A01c 23/02
[58] Field of Search ..................... 111/6.7; 172/699

[56] References Cited
UNITED STATES PATENTS
| | | | |
|---|---|---|---|
| 3,413,940 | 12/1968 | Vissers | 111/7 |
| 3,378,279 | 4/1968 | Jacobs | 111/7 |
| 2,584,484 | 2/1952 | McIntosh | 111/7 X |
| 3,218,999 | 11/1965 | Pattison | 111/7 |
| 2,843,066 | 7/1958 | Dugan | 111/7 |
| 3,608,645 | 9/1971 | Meiners | 111/7 |

Primary Examiner—Stephen C. Pellegrino
Attorney, Agent, or Firm—Mason, Mason & Albright

[57] ABSTRACT

A manure spreader comprising a frame movable over the ground and a container mounted on said frame. A dispensing device is provided for supplying liquid manure from the container to an area under the ground surface. The dispenser has coupling points by means of which it is attachable to the three-point hitch of a tractor or other propelling vehicle.

9 Claims, 9 Drawing Figures

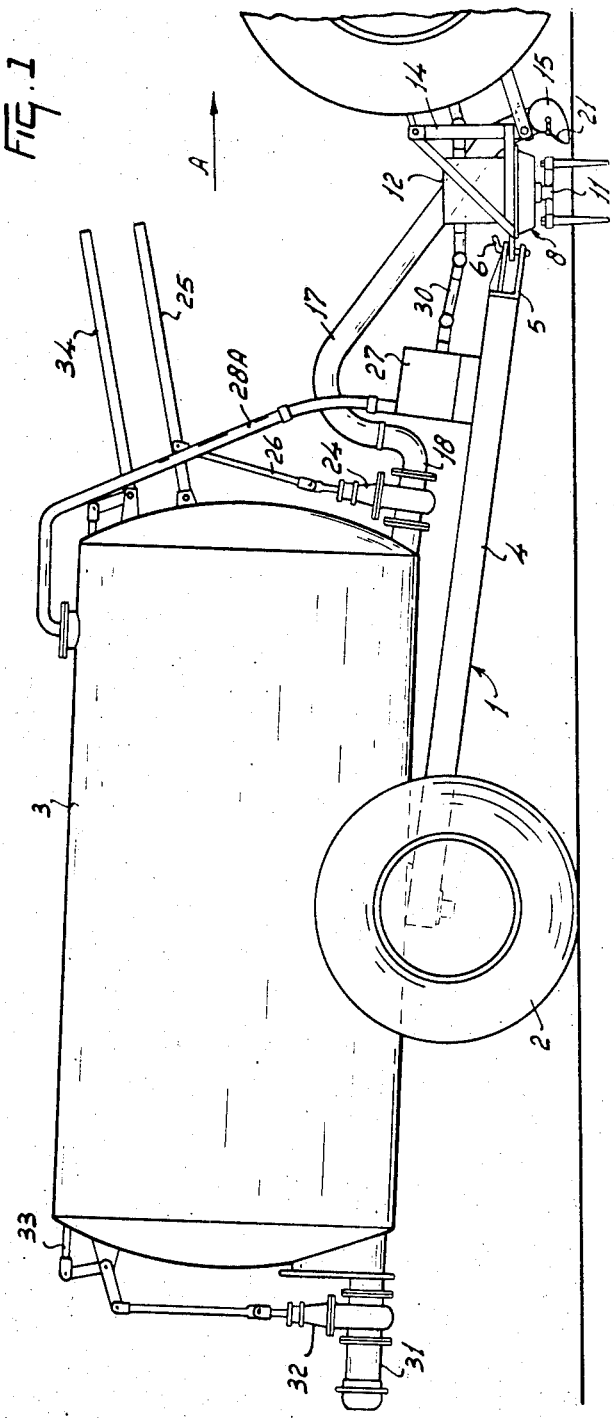

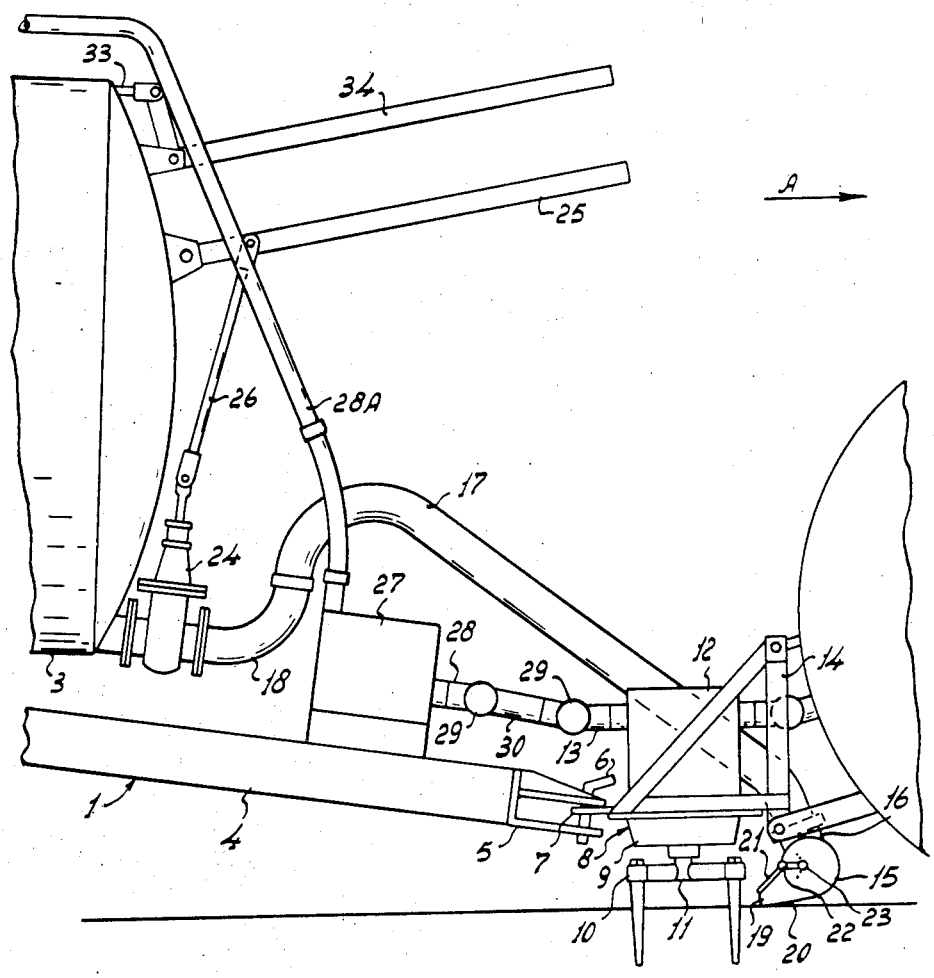

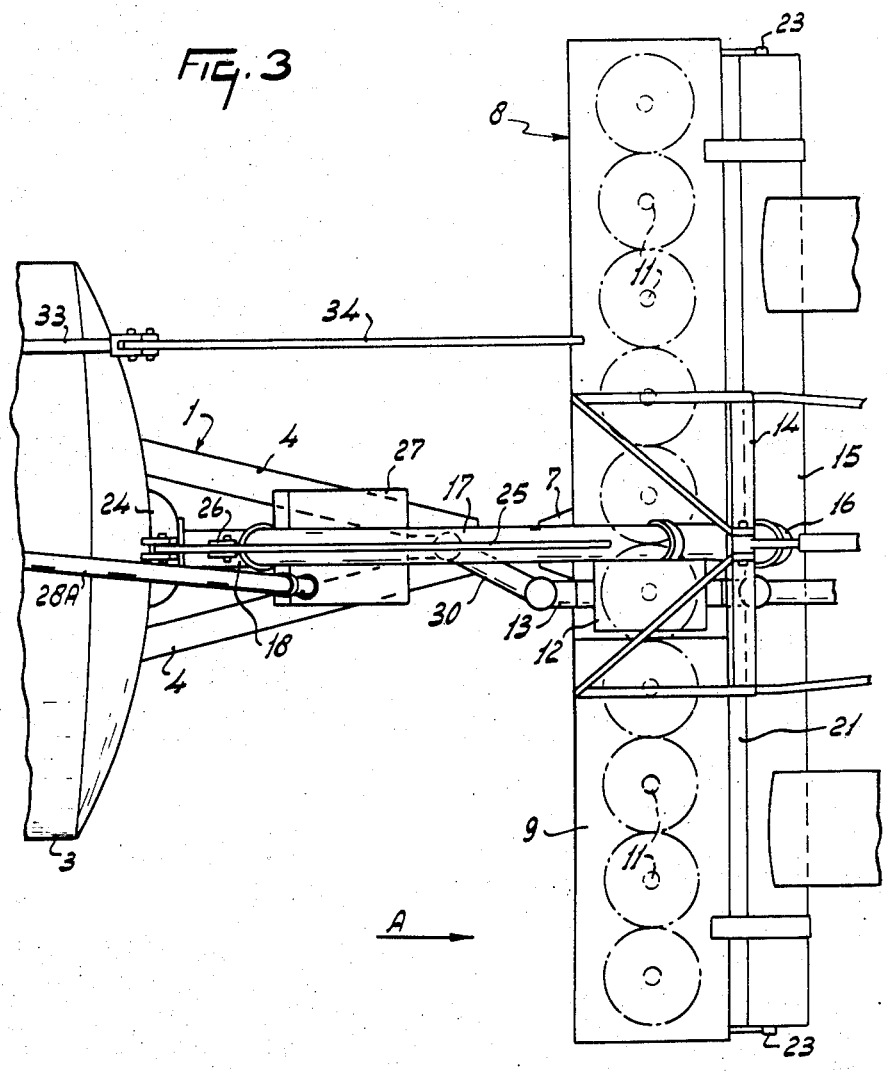

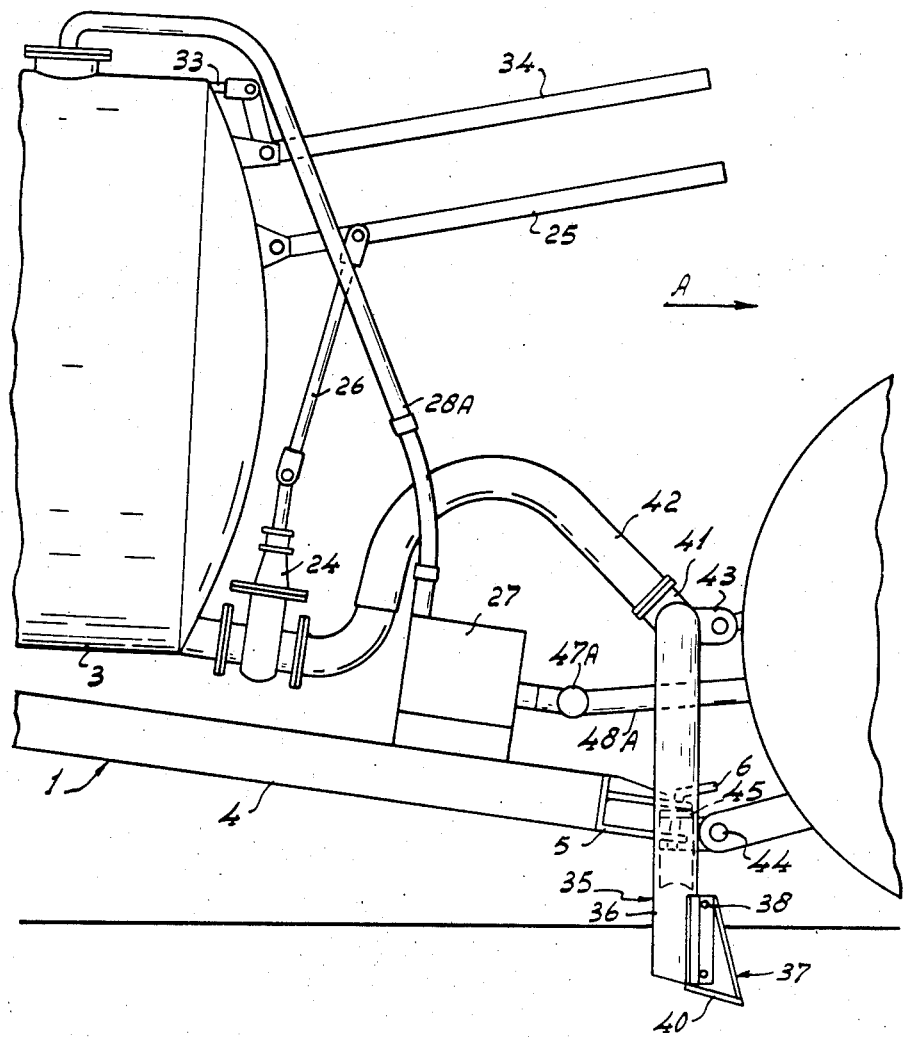

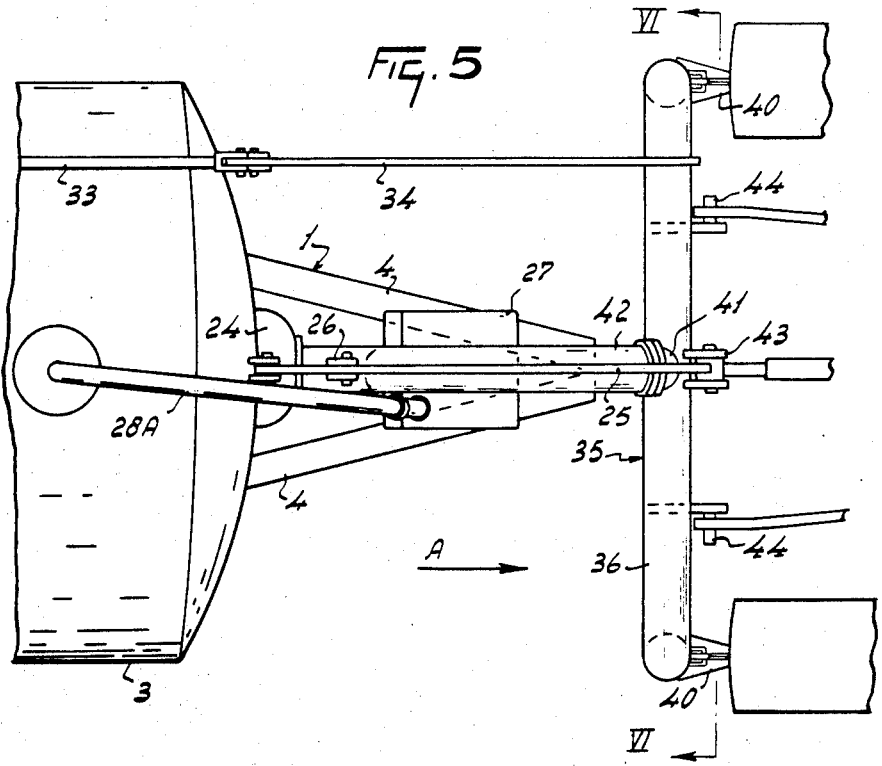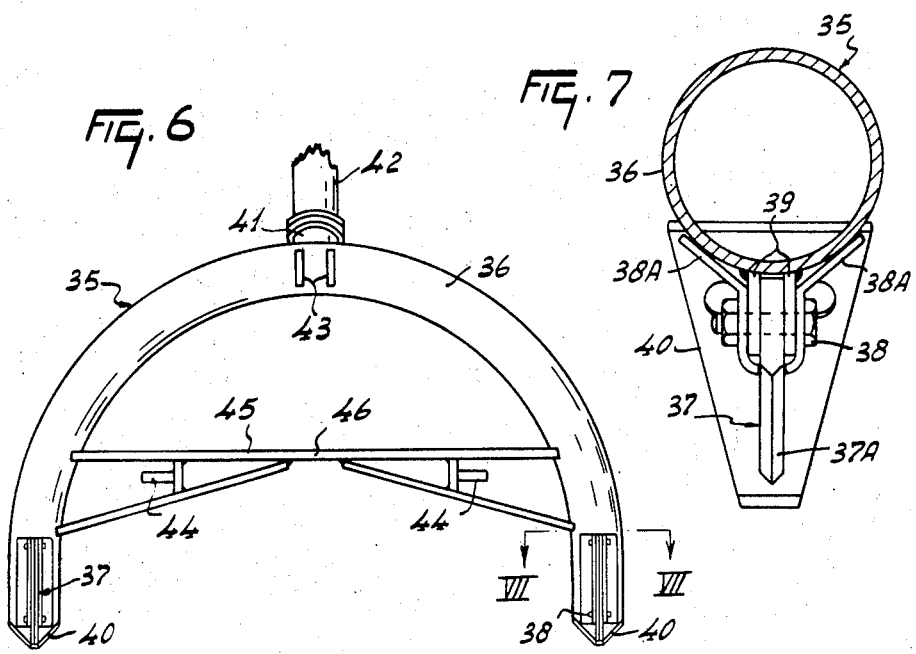

MANURE SPREADER

The invention relates to a manure spreader comprising a frame movable over the ground and a container being mounted on said frame, dispensing means being located for supplying liquid manure from the container to the treatment site below the ground surface.

With known manure spreaders of this kind, the dispensing means for liquid manure is attached to the frame of the spreader on the rear side thereof. Further, there must be included some kind of mechanism by means of which, after the spreading has been effected, the dispenser can be moved to an inoperative position and, heretofore, this has been done with comparatively complicated construction.

The invention has for its object to provide a dispenser construction that facilitates the conversion of same to an inoperative position. In accordance with the invention, there is provided a manure spreader comprising a frame movable over the ground, a container mounted on said frame, and dispensing means having coupling points by means of which the dispenser is attachable to the three-point lift hitch of a tractor or other propelling vehicle. With this construction, the said dispenser can be moved to an inoperative position by the simple lifting of the three-point hitch of the tractor.

Figure 8:
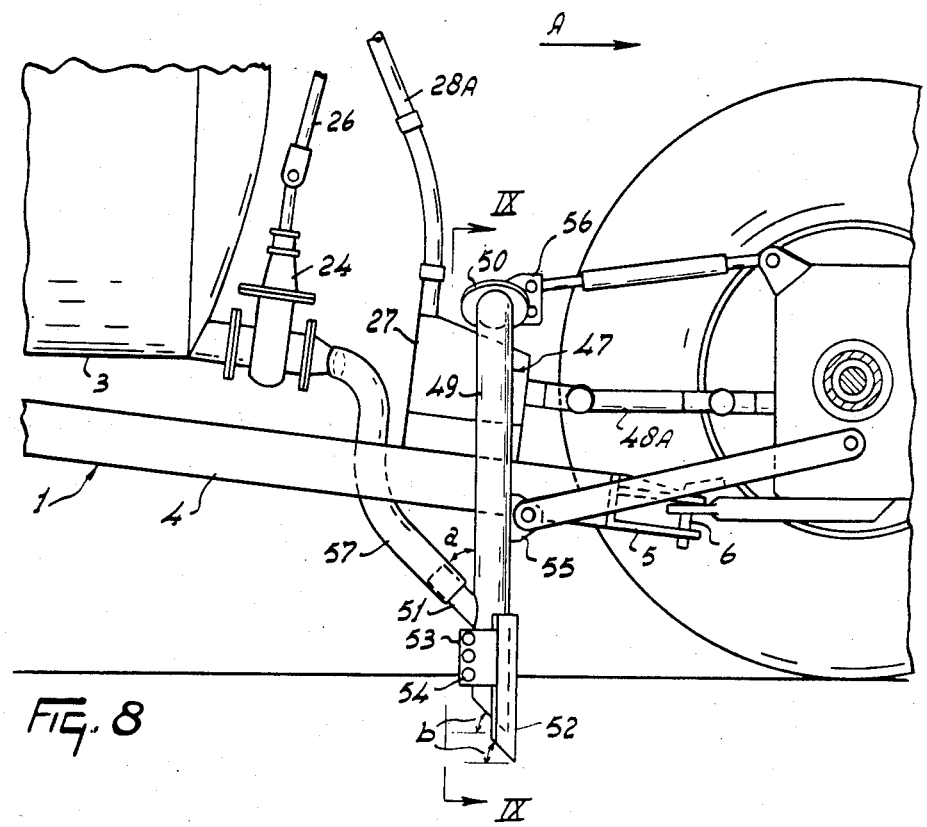
Figure 9:
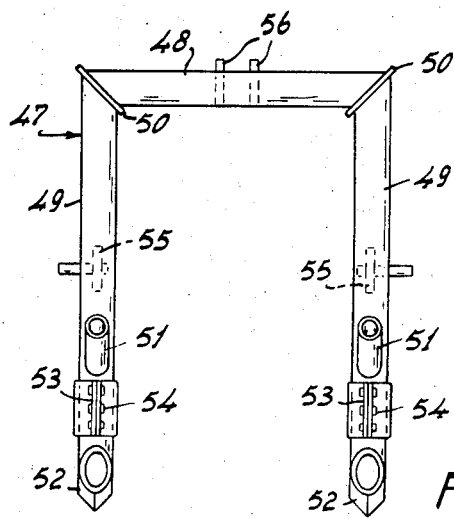

For a better understanding of the invention and to show how the same may be carried into effect, reference is made by way of example to the accompanying drawings in which:

FIG. 1 is a side view of the spreader in its operative position,

FIG. 2 is an enlarged scale of the forward part of the spreader shown in FIG. 1, FIG. 3 is a plan view of the spreader shown in FIG. 2, FIG. 4 is a side view of the forward part of the second embodiment of a spreader according to the invention, the spreader being in its operative working position, FIG. 5 is a plan view of the spreader shown in FIG. 4, FIG. 6 is a view according to the line VI—VI in FIG. 5, FIG. 7 is a section along the line VII—VII in FIG. 6, FIG. 8 is a side view of the forward part of a third embodiment of a spreader according to the invention, FIG. 9 is a view according to the line IX—IX in FIG. 8.

The embodiments shown in the Figures relate to a manure spreader which comprises a frame 1 supported by ground wheels 2 and on which a container 3 is mounted. The location of the supporting or ground wheels 2 is such that in side view these wheels lie substantially in the center of the container 3 which extends longitudinally in the direction of travel of the spreader and which, during operation, lies substantially horizontally, as is shown in FIG. 1. The frame 1 has, as seen in plan view (FIG. 3) mainly a triangular form with upwardly extending sides 4 that extend in the direction of travel and form a draw bar. The draw bar is hingeably coupled at its forward end by means of a coupling piece 5 and a pin 6 to a tag 7 on the rear side of the frame of a cultivator 8. The frame of the cultivator 8 comprises a box-shaped transversely extending beam 9 in which a number of tined soil working members 10 are mounted, each of which is rotatable about a substantially vertical shaft 11. Each shaft 11 is provided, inside the box-shaped beam 9 with a corresponding spur-toothed pinion not shown. Hereby the teeth of neighboring pinions are in mesh with each other. The uppermost end of one of the shafts of the center two soil working members 8 is extended upwardly beyond the beam 9 to carry a bevel pinion at its uppermost end. The bevel pinion (not shown) is located in a gear box 12 disposed near the center of the cultivator and which also contains a bevel pinion whose teeth are in driving mesh with those of the first-mentioned bevel pinion and which is mounted on a rotary shaft 13 which extends substantially parallel to the direction of travel of the spreader and which both at the front and the rear side of the gear box 12, emerges from the same.

The front side of the box-shaped beam 9 is provided with a support 14 which can be coupled to the three-point lifting hitch of a tractor and on its lower side carries a tube 15 which extends throughout the total working width of the cultivator in a transverse and substantially horizontal direction. The tube 15 is, near its center, provided with an inlet 16 which by means of a conduct 17 is connected to an outlet 18 of the container 3. The tube 15 is at its rear side provided with a slot 19 which extends throughout the whole length of the tube. The lowermost edge of the slot 19 comprises a strip 20 which extends obliquely downwardly and to the rear and, during operation, travels over the ground. The width of the slot 19 can be varied by means of an adjustable flap 21 which is turnable about a substantially horizontal axis 22 disposed on the rear side of the tube 15 by means of an adjusting mechanism 23 which lies on one end of the tube (See FIG. 2). The flap 21 can be brought into a number of positions for varying the width of the slot 19. The outlet 18 of the container 3 is provided with a closing valve 24 which can be actuated by means of a lever 25 which is pivotally connected to the front of the container 3 and, further, is pivotally coupled to a rod 26 which is pivotally connected to the upper side of an adjustable part of the valve.

In front of the container 3 there is mounted on the frame 1 a pump 27 which by means of a conduit 28A is connected with the upper side of the container 3. The pump 27 has a driving shaft 28 which by means of universal joints 29 and a connecting shaft 30 is coupled to the rear end of the shaft 13 which emerges from the rear side of the gear box 12. At the rear of the container 3 there is provided an inlet 31 which includes a closing valve 32 which can be actuated from the front side of the container 3 by means of a rod system 33 which at the front side comprises a lever 34. During operation the support 14 on the cultivator 8 is coupled to the three-point linking hitch of a tractor whereas the driving shaft 13 at the front of the gear box 12 is coupled by means of universal joints and a connecting shaft to the p.t.o. power take off of the tractor. By means of the pump 27 the container 3 can be filled from a manure pit or the like via the inlet 31.

During operation, the spreader takes the position as shown in FIG. 1, whereby the implement is moved in the direction of the arrow A. The pump 27 which can be driven as stated above from the rear side of the gear box 12 of the cultivator 8, during operation, pressurizes the liquid in the container 3 which after opening of the valve 24 in the inlet 18 at the front side of the container through the conduct is brought into the longitudinal, transversely extending tube 15 which lies in front of the cultivator and moves by means of the strip 20 at the lower edge of the slot 19 over the ground. Through the slot 19 the liquid manure is spread onto the ground and by means of the rotating tine soil working members 10 of the cultivator 8, is supplied to treat an area under the surface of the ground. By means of the adjustable flap 21 the spreading of the manure onto the ground can be regulated.

After emptying the container 3 by means of the three-point linking hitch the cultivator can be lifted out of the ground whereby the frame 1 carrying the container pivots about the axis of the ground supporting wheels 2 and can be transported.

With the aforementioned construction, the means for supplying liquid manure under the surface of the ground which means is formed by the combination of the described cultivator 8 and the tube-like member 15 can be easily lifted out of the ground after which the implement can be transported and driven back to a pit or the like for refilling the container.

In the FIGS. 4-7, there is shown an embodiment whereby the means for bringing the liquid manure under the surface of the ground is different from the means shown in the first embodiment. With the embodiment shown in FIGS. 4-7, the said means comprise a tube-like member 35 which is of arcuate configuration with the legs 36 extending downwardly. The said member lies parallel to a vertical plane transverse to the direction of travel of the implement. The lower ends of the legs 36 are provided with openings for supplying the liquid manure into the soil. In front of each of the openings there is provided a plow member 37 with a cutting edge 37A which by means of bolts 38 and clamping pieces 38A can be secured to supports 39 on the legs 36 of the tube-like member 35. Hereby each of the plow members 37 carry at their lower sides a sole 40 which extends downwardly from the supports 39. By loosening the bolts 38 the plow members can be replaced by other kinds of plow members. The highest point of the arcuate tube-like member 35 is provided with an inlet opening 41 which by means of a conduct 42 is connected to the outlet 18 of the container 3. At its front side, the tube-like member 35 is provided with hitch points 43, 44 by means of which this tube-like member can be coupled to the three-point hitch of a tractor. The lower hitch points are secured to a horizontally extending support strip 45 which is provided between the downwardly extending legs 36 of the tube-like member 35. In its middle, the strip 45 is provided with a coupling point 46 to which the coupling piece 5 of the draw bar of the frame 1 which carries the container 3 is hingeably connected. With this embodiment, the pump 27 is directly coupled to the power take off by means of joints 47A and a connecting shaft 48A. During operation, the implement can be moved into the direction of the arrow A as indicated in the Figures. Hereby the plow members move through the ground and form a furrow in which liquid which can be dispensed from the container through the hose in the tube-like member from which it is dispensed via the legs 36 in the soil. The plow members 37 are placed in such a way that the ground-engaging wheels 2 of the container-carrying frame 1 move over the opened furrow and thus the furrow is closed again so that the liquid manure is supplied correctly to the subsoil. After carrying out the operation by means of the three-point hitching means, the dispenser, including the tube-like member 35, can be lifted as is shown and the spreader can be brought to the pit for refilling of the container.

With the embodiment shown in FIGS. 8 and 9, the dispenser for supplying liquid manure under the ground surface is afforded by a tube-like member 47 in an U-form, which extends parallel to a plane normally to the direction of travel A of the spreader. The tube-like member 47 comprises a horizontally extending connecting portion 48 and two downwardly extending legs 49. Each of the legs 49 is secured to the said connecting portion 48 by means of a flange 50. Near its free end each leg 49 has an inlet 51, which is disposed at the rear side and extends obliquely upwards making an angle a of approximately 45° with the corresponding leg. The free end of each leg 49 carries a plow member 52 which by means of clamps 53 and bolts 54 is secured to a leg 49. As is shown in FIG. 8 the lower side of the free end of each leg 49 and the lower side of a plow member 52 are inclined upwardly in a direction opposite to the direction of travel of the spreader at an angle b of approximately 45°.

The tube-like member 47 is provided at its front side with coupling members 55 and 56 for coupling the same to the three-point lifting hitch of the tractor.

Each inlet 51 is coupled to a conduct 57 which is connected to the outlet of the container 3. In operation, liquid manure is brought from the container via the conducts 57 and the lower part of each of the legs 49 into furrows made by each of the plow members 52. With this embodiment, the frame carrying the container 3 by means of the coupling piece 5 can be directly connected to a draw-hook at the rear of the tractor. Although not shown the tube-like members of the embodiments shown in FIGS. 4-9 can be provided with more than two downwardly extending legs.

It is to be understood that the invention is not limited to the specific features and embodiments hereinabove described but may be carried out in other ways without departure from its spirit.

Having thus described my invention, what I claim as new and desire to Secure by Letters Patent of the United States is:

1. A manure spreader comprising a frame movable over the ground and a container in communication with dispensing means supported on said frame, means hingeably connecting said frame with said dispensing means and said spreader having pivotable coupling points at its forward portion for coupling the spreader to three-point lifting hitch of a prime mover, said dispensing means comprising conduit means and a substantially rigid dispensing tube, said conduit means extending forwardly of said container and being in communication with said rigid dispensing tube, said tube having a lower portion extending under the ground surface and opening means in said lower portion, said tube, in part, extending substantially horizontal and transverse relative to the normal direction of travel of the spreader, soil penetrating means supported on the lower portion of said tube and said dispensing tube being vertically movable by said three point lifting hitch to an inoperative position together with said soil penetrating means as a unit.

2. A spreader as claimed in claim 1, wherein said tube has at least one opening and a sub soil plow member is positioned adjacent said opening.

3. A spreader as claimed in claim 1, wherein said tube has an arcuate configuration with downwardly extending legs and each of said legs has an opening adjacent its lower end with a plow member being positioned adjacent each opening.

4. A spreader as claimed in claim 1, wherein said tube is U-form in configuration with downwardly extending legs, the rear side of each leg having an inlet for receiving fertilizer from said container and a plow member at the lower ends of said legs.

5. A spreader as claimed in claim 4, wherein the lower end of a leg and its plow member, are inclined upwardly in a direction opposite to the direction of travel of the spreader.

6. A spreader as claimed in claim 1, wherein said tube has a rear coupling point and said frame is hingeably connected to said coupling point.

7. A spreader as claimed in claim 1, wherein said tube has a plurality of coupling points which are connectable to the three-point hitch of the prime mover.

8. A spreader as claimed in claim 1, wherein a pump is mounted on said frame and connected to said container for filling same with fertilizer and by means of which said fertilizer can be pressured to said dispensing means, an outlet at the front of said container with a valve positioned to control said outlet, said container having a valved inlet at the rear thereof.

9. A spreader as claimed in claim 1, wherein said pivotable coupling points are secured to said dispensing means and said spreader is pivotably connectable to the prime mover through said dispensing means.

* * * * *